US011126584B2

(12) United States Patent
Nam et al.

(10) Patent No.: US 11,126,584 B2
(45) Date of Patent: Sep. 21, 2021

(54) METHOD FOR TRANSFERRING REQUEST IN STORAGE DEVICE AND METHOD FOR ISSUING COMMAND IN HOST

(71) Applicant: Samsung Electronics Co., Ltd., Suwon-si (KR)

(72) Inventors: ByungWoo Nam, Hwaseong-si (KR); Seongnam Kwon, Bucheon-si (KR); Jaesub Kim, Seoul (KR); Jong Youl Lee, Seoul (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 702 days.

(21) Appl. No.: 15/336,018

(22) Filed: Oct. 27, 2016

(65) Prior Publication Data

US 2017/0123659 A1 May 4, 2017

(30) Foreign Application Priority Data

Oct. 30, 2015 (KR) ........................ 10-2015-0151974

(51) Int. Cl.
*G06F 13/42* (2006.01)
(52) U.S. Cl.
CPC ................................ *G06F 13/4282* (2013.01)
(58) Field of Classification Search
CPC .................................................. G06F 1/3203
See application file for complete search history.

(56) References Cited

U.S. PATENT DOCUMENTS

| 5,345,347 | A   | * | 9/1994  | Hopkins ............... G06F 1/3215 360/71 |
|-----------|-----|---|---------|-------------------------------------------|
| 6,760,824 | B2  |   | 7/2004  | Urabe et al.                              |
| 7,111,189 | B1  |   | 9/2006  | Sicola et al.                             |
| 7,290,086 | B2  |   | 10/2007 | Beardsley et al.                          |
| 7,526,000 | B2  |   | 4/2009  | Van Gestel                                |
| 7,548,994 | B2  |   | 6/2009  | Ali et al.                                |
| 7,624,395 | B2  | * | 11/2009 | Dostert ............... G06F 11/3409 718/1 |
| 7,679,133 | B2  |   | 3/2010  | Son et al.                                |
| 7,757,124 | B1  |   | 7/2010  | Singh et al.                              |
| 8,108,582 | B2  |   | 1/2012  | Ambikapathy et al.                        |
| 8,231,136 | B2  |   | 7/2012  | Fiore, Jr.                                |
| 8,553,466 | B2  |   | 10/2013 | Han et al.                                |

(Continued)

FOREIGN PATENT DOCUMENTS

| CN | 1669290 A      | 9/2005  |
|----|----------------|---------|
| CN | 103945166 A    | 7/2014  |
| KR | 2015-0112075 A | 10/2015 |

OTHER PUBLICATIONS

Chinese Office Action dated Sep. 22, 2020.

*Primary Examiner* — Henry Tsai
*Assistant Examiner* — Juanito Borromeo
(74) *Attorney, Agent, or Firm* — Harness, Dickey & Pierce, P.L.C.

(57) ABSTRACT

At least one example embodiment provides a method for transferring a request in a storage device. The method includes generating an asynchronous command completion that corresponds to an asynchronous event request command and has a wall clock time request, receiving a set features command having a timestamp, the set features command corresponding to the asynchronous command completion, and updating the wall clock time using the timestamp.

20 Claims, 13 Drawing Sheets

(56) References Cited

U.S. PATENT DOCUMENTS

| | | |
|---|---|---|
| 8,559,235 B2 | 10/2013 | Yoon et al. |
| 8,631,284 B2 | 1/2014 | Stevens |
| 8,654,587 B2 | 2/2014 | Yoon et al. |
| 9,426,423 B2 | 8/2016 | Halavy et al. |
| 2011/0072442 A1 | 3/2011 | Abdelhadi et al. |
| 2011/0233648 A1 | 9/2011 | Seol et al. |
| 2014/0195651 A1* | 7/2014 | Stockhammer .. H04N 21/23439 709/219 |
| 2015/0278087 A1 | 10/2015 | Han et al. |

* cited by examiner

| Bit | Description |
|---|---|
| 31:24 | Reserved |
| 23:16 | Not used (log page identifier) |
| 15:08 | 3h (request type : timestamp requested) |
| 07:03 | Reserved |
| 02:00 | 2h (type : notice) |

| Bit | Description |
|---|---|
| 31:24 | Reserved |
| 23:16 | Not used (log page identifier) |
| 15:08 | 4h (request type : supported NVMe version by host) |
| 07:03 | Reserved |
| 02:00 | 2h (type : notice) |

METHOD FOR TRANSFERRING REQUEST IN STORAGE DEVICE AND METHOD FOR ISSUING COMMAND IN HOST

CROSS-REFERENCE TO RELATED APPLICATION

This U.S. non-provisional patent application claims priority under 35 U.S.C. § 119 Korean Patent Application No. 10-2015-0151974 filed on Oct. 30, 2015, the entire contents of which is hereby incorporated by reference herein.

BACKGROUND

1. Field

Example embodiments of inventive concepts disclosed herein relate to request methods of a storage device and command issuing methods of a host.

2. Description of Related Art

An operating speed of a host, which communicates with a storage device, such as a computer, a smart phone, or a smart pad is improved as semiconductor manufacturing technologies develop. Furthermore, the size of content used in the storage device and a host device of the storage device is increasing.

SUMMARY

Example embodiments of inventive concepts provide request methods of a storage device and command issuing methods of a host which are capable of providing requirements of the storage device to the host.

According to an example embodiment, a method for transferring a request in a storage device is provided. The method includes generating an asynchronous command completion corresponding to at least one asynchronous event request command, the asynchronous command completion including a wall clock time request, receiving a set features command corresponding to the asynchronous command completion, the set features command having timestamp, and updating a wall clock time using the timestamp.

According to another example embodiment, a method for transferring a request in a storage device is provided. The method includes receiving an asynchronous event request command, determining whether to obtain a protocol version about the storage device, generating an asynchronous command completion, based on the determining, the asynchronous command completion corresponding to the asynchronous event request command, the asynchronous command completion including a protocol version request, receiving a set features command having protocol version information, the set features command corresponding to the asynchronous command completion, and operating the storage device using the protocol version information.

According to still another example embodiment, a method for issuing a command by a host is provided. The method includes receiving an asynchronous command completion, the asynchronous command completion having a device request from a storage device, parsing the device request in response to the asynchronous command completion and issuing a synchronous command corresponding to the device request, and receiving a synchronous command completion corresponding to the synchronous command.

At least one example embodiment provides a storage device including a processor configured to execute computer readable instructions to obtain at least one asynchronous command, generate an asynchronous command completion, the asynchronous command completion including a request, send the request to an external host and receive a synchronous command corresponding to the request.

In an example embodiment, the request is a wall clock request and the synchronous command indicates a timestamp corresponding to the wall clock request.

In an example embodiment, the request is a protocol version request and the synchronous command indicates a protocol version corresponding to the protocol version request.

In an example embodiment, the processor is configured to send a synchronous command completion to the external host.

In an example embodiment, the processor is configured to buffer a number of the at least one asynchronous command.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
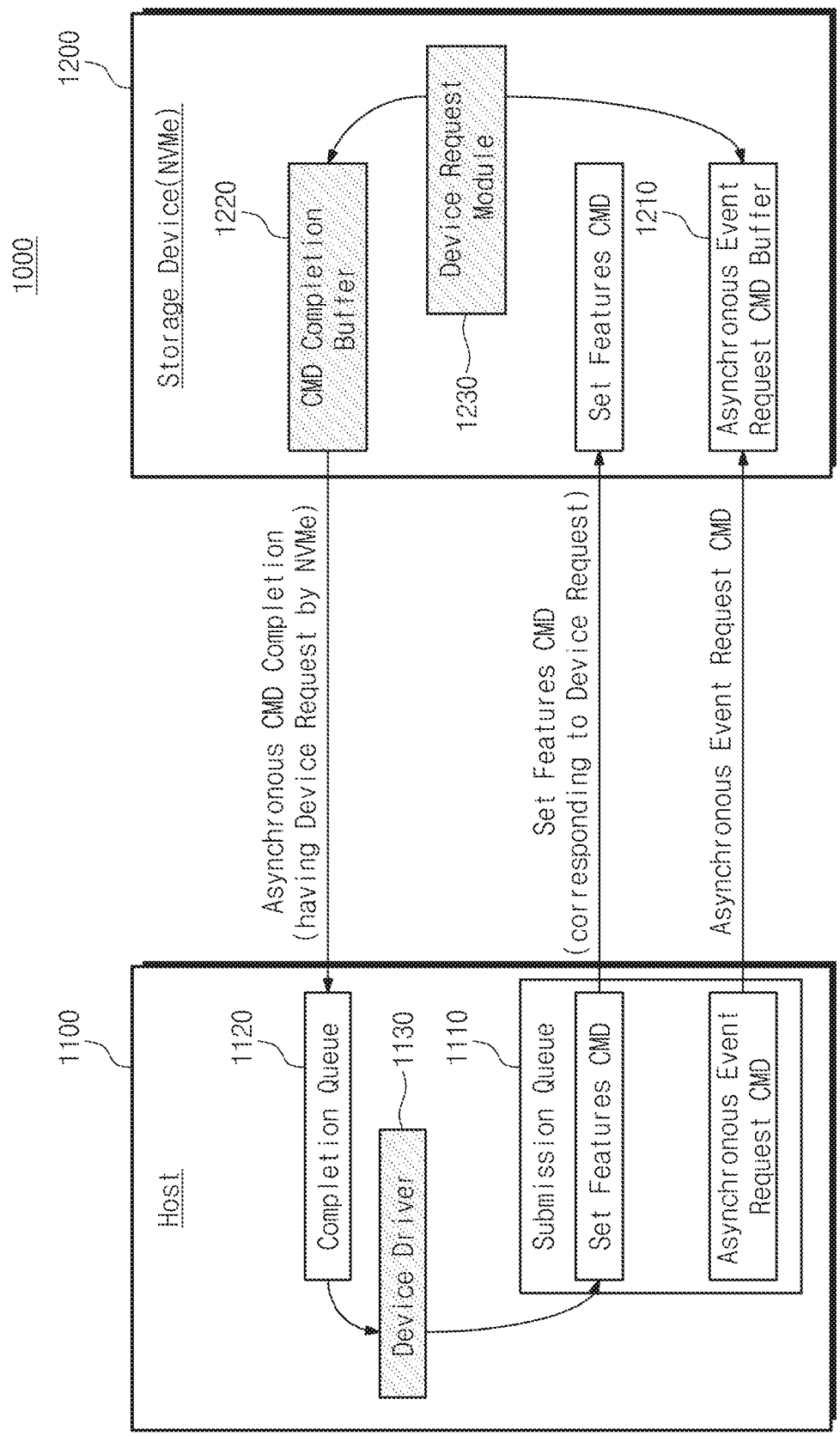
FIG. 1 is a diagram illustrating a host system according to an example embodiment of inventive concepts.

Various example embodiments will be described more fully hereinafter with reference to the accompanying drawings, in which some example embodiments are shown. The example embodiments may, however, be embodied in many different forms and should not be construed as limited to the example embodiments set forth herein. Rather, these example embodiments are provided so that this description will be thorough and complete, and will fully convey the scope of the example embodiments to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, fourth etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this example embodiment belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Units, controllers and/or devices (e.g., host 1100, controller 1250, etc. discussed in more detail below) according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units, controllers and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Example embodiments of inventive concepts explained and illustrated herein include their complementary counterparts. The same reference numerals or the same reference designators denote the same elements throughout the specification.

FIG. 1 is a diagram illustrating a storage system 1000 according to an example embodiment of inventive concepts. Referring to FIG. 1, a storage system 1000 may include a host 1100 and a storage device (e.g., a non-volatile memory (NVM) that operates according to NVM Express (NVMe)) 1200.

Here, the storage system 1000 may include one of a plurality of devices such as a computer, a portable computer, an ultra-mobile personal computer (UMPC), a workstation, a data server, a net-book, a personal data assistant (PDA), a web tablet, a wireless phone, a mobile phone, a smart phone, an e-book, a portable multimedia player (PMP), a digital camera, a digital audio recorder/player, a digital picture/video recorder/player, a portable game machine, a navigation system, a black box, a 3D television, a device capable of transmitting and receiving information wirelessly, one of various electronics devices constituting a home network, one of various electronics devices constituting a computer network, one of various electronics devices constituting a telematics network, a radio-frequency identification (RFID) device, or one of various electronic devices constituting a computing system.

The host 1100 may include a submission queue 1110, a completion queue 1120, and a device driver 1130.

The submission queue 1110 may store commands to be processed by the storage device 1200. The submission queue 1100 may store a synchronous command in which time-out is present and an asynchronous command in which time-out is not absent.

In an example embodiment, the synchronous command may include a read/write command for an input/output of data stored in the storage device 1200, a set features command for settings of the storage device 1200, and the like.

The set features command may include arbitration, power management, a logical address (LBA) range type, a temperature threshold, error recovery, a volatile mite cache, interrupt coalescing, an interrupt vector configuration, mite atomicity normal, an asynchronous event configuration, autonomous power state transition, a host memory buffer, command set specific, vendor specific, a wall clock time or a timestamp corresponding to an absolute time, a protocol version supported, and the like.

In an example embodiment, the set features command may be issued according to the determination of the host 1100. In another example embodiment, the device driver 1130 may issue the set features command in response to a request by the storage device 1200.

In an example embodiment, the asynchronous command may include an asynchronous event request command. Asynchronous events may be used to inform software of the host 1100 of status, error, and health information of the storage device 1200. The storage device 1200 may inform the host 1100 of an event using an asynchronous command completion that corresponds to the asynchronous event request command.

Furthermore, the asynchronous event request command may be used to send a device request to the host 1100. For example, when the storage device 1200 transfers a request to the host 1100, the storage device 1200 may include a device request about the host 1100 in the asynchronous command completion of the asynchronous event request command. The host 1100 may parse the device request included in the asynchronous command completion and may issue a command (e.g., a set features command) that corresponds to the device request.

In an embodiment, the host 1100 may manage the number of asynchronous event request commands issued so as to maintain the number of request commands at or below a value (e.g., a reference/threshold value).

The command completion queue 1120 may store an asynchronous command completion provided from the storage device 1200.

The device driver 1130 may determine whether to issue the set features command, using the asynchronous command completion stored in the command completion queue 1120. For example, when the device request is determined as being included in the asynchronous command completion, the device driver 1130 may issue the set features command corresponding to the device request. The set features command issued may be stored in the submission queue 1110.

The storage device 1200 may be implemented with a nonvolatile memory device that uses NVMe. The storage device 1200 may include an asynchronous event request command buffer 1210, an asynchronous command completion buffer 1220, and a device request module 1230.

The asynchronous event request command buffer 1210 may store asynchronous event request commands, which are issued from the host 1100, in the submission queue 1110.

The asynchronous command completion buffer 1220 may store a command completion that includes information indicating whether a synchronous command or an asynchronous command provided to the storage device 1200 is completed (success or fail).

The device request module 1230 may determine whether a device request to be used to manage the storage device 1200 is required, based on policy, algorithm, or environment information (e.g., a noise, a temperature, etc.). When the device request is present, the device request module 1230 may include a device request in an asynchronous command completion about one of asynchronous event request commands. That is, the device request module 1230 may issue an asynchronous command completion having a device request. The asynchronous command completion including the device request thus issued may be transferred to the completion queue 1120 of the host 1100 through the asynchronous command completion buffer 1220. Here, the device request may correspond to at least one set features command.

In an embodiment, the device request module 1230 may be implemented with software, hardware, or firmware.

According to an example embodiment, the storage system 1000 may transfer a device request of the storage device 1200 to the host 1100 using the asynchronous command completion corresponding to the asynchronous event request command.

Figure 2:
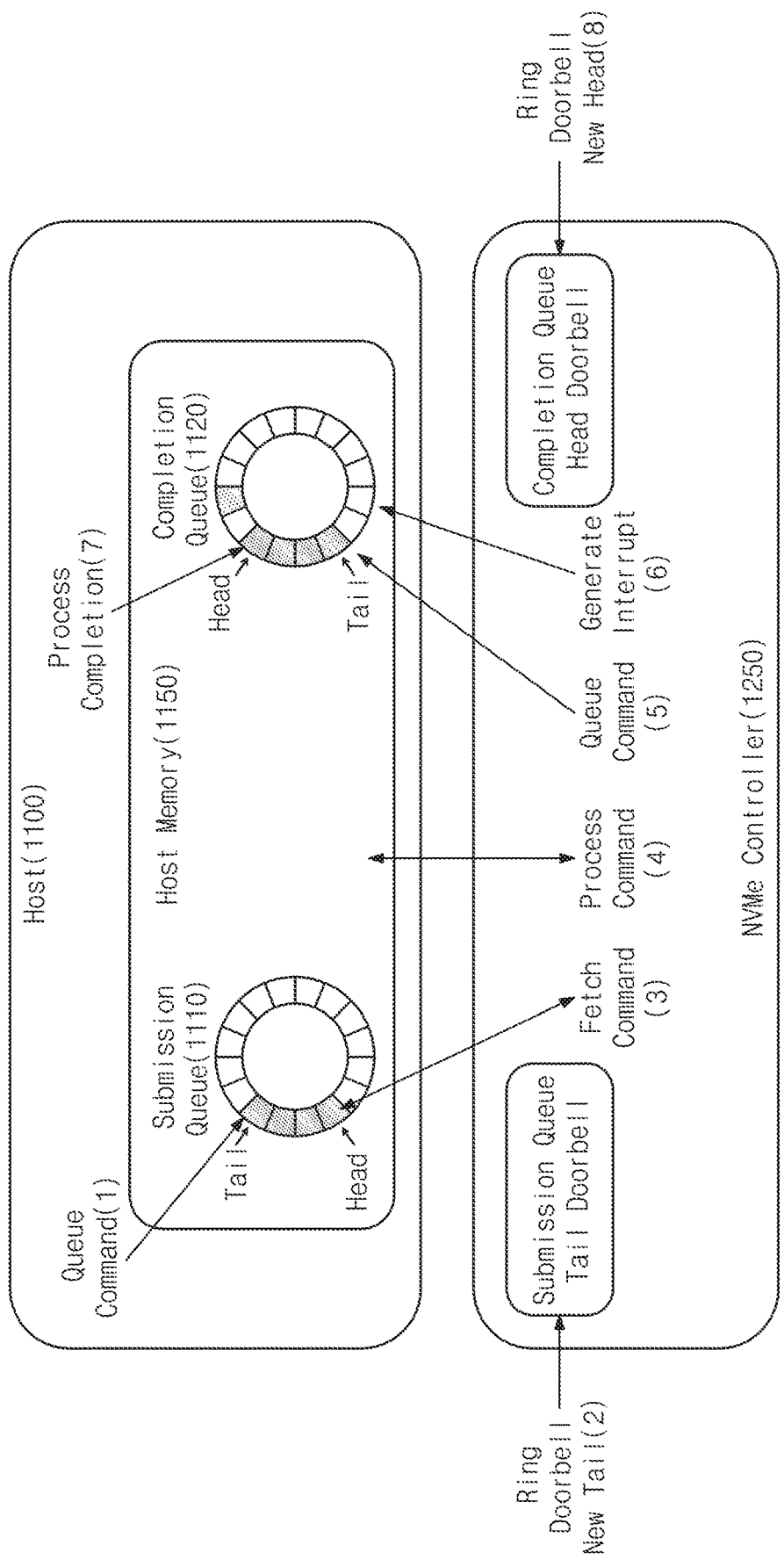
FIG. 2 is a diagram illustrating a queue interface method for command processing, according to an example embodiment of inventive concepts.

FIG. 2 is a diagram illustrating a queue interface method for command processing, according to an example embodiment of inventive concepts. Referring to FIG. 2, the method will be performed in a command queue interface as follows.

The command queue interface may be performed based on a queue pair that is composed of the submission queue 1110 for a command request and the completion queue 1120 for process completion of a corresponding command. A host memory 1150 of the host 1100 may include the submission queue 1110 and the completion queue 1120 that are configured in the form of a ring buffer.

The host 1100 may issue a queue command to the submission queue 1110 (1). The host 1100 may write an updated submission queue tail pointer at a tail doorbell of a memory controller 1250 (2). In an example embodiment, the memory controller 1250 may include a physical controller and/or a plurality of virtual function controllers. The memory controller 1250 may fetch a command from the submission queue 1110 (3). The memory controller 1250 may process the fetched command (4). The memory controller 1250 may write an asynchronous command completion at the completion queue 1120 after processing the command (5). The memory controller 1250 may issue an interrupt (6). The host 1100 may process the asynchronous completion command. The host 1100 may write an updated completion queue tail pointer at a head doorbell of the memory controller 1250 (8).

Figures 3, 4:
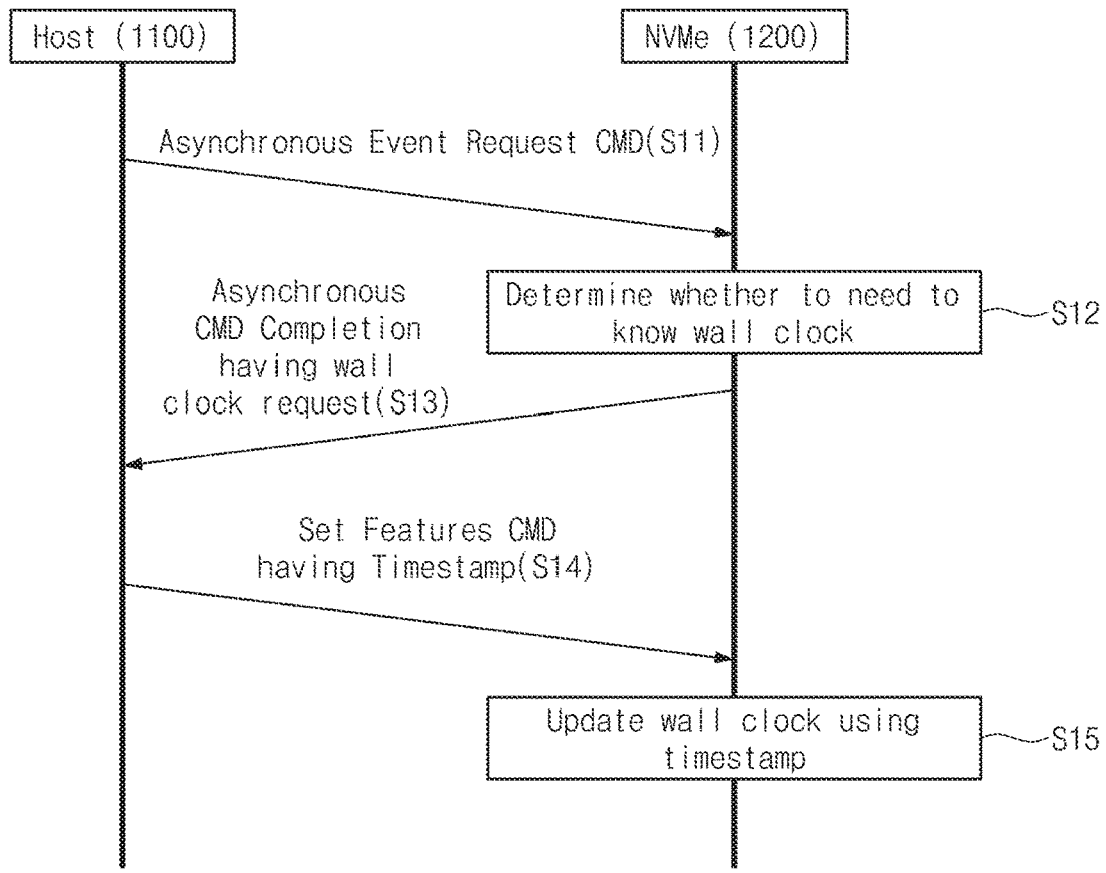
FIG. 3 is a diagram illustrating a method of requesting a wall clock time, according to an example embodiment of inventive concepts.
FIG. 4 is a diagram illustrating an asynchronous command completion according to an example embodiment of inventive concepts.

FIG. 3 is a diagram illustrating a method of requesting a wall clock time, according to an example embodiment of inventive concepts. Below, a wall clock time request method of the storage device 1200 will be described with reference to FIGS. 1 to 3.

The host 1100 may issue a plurality of asynchronous event request commands a S11. The storage device 1200 may fetch the plurality of asynchronous event request commands. The plurality of asynchronous event request commands thus fetched may be stored in the asynchronous event request command buffer 1210. At S12, the storage device 1200 may determine whether a wall clock time, based on internal policy or the selection of a user is to be known. Here, the wall clock time may be a clock corresponding to an absolute time. If a wall clock time is to be known, the storage device 1200 may insert a wall clock time request into an asynchronous request completion about one of the asynchronous event request commands. The storage device 1200 may transfer the asynchronous command completion having the wall clock time request to the host 1100 at S13.

The host 1100 may transfer a set features command, which corresponds to the asynchronous command completion having the wall clock time request, to the storage device 1200 at S14. Here, the set features command may include a timestamp having current time information. The storage device 1200 may update a wall clock time using the timestamp at S15.

According to an example embodiment, the storage device 1200 may transfer, to the host 1100, the wall clock time request that is included in the asynchronous command completion of the asynchronous event request command.

FIG. 4 is a diagram illustrating an asynchronous command completion according to an example embodiment of inventive concepts. Referring to FIG. 4, the asynchronous command completion may include three bits [02:00] indicating a type of the asynchronous command completion, five bits [07:03] of a first reserved area, eight bits [15:08] indicating a request type, eight bits [23:16] that are not used and indicate a log page identifier, and eight bits [31:24] of a second reserved area. Here, the request type may include bits corresponding to a timestamp request.

Example embodiments of inventive concepts may be applied to request protocol version information used to drive a storage device.

Figures 5, 6:
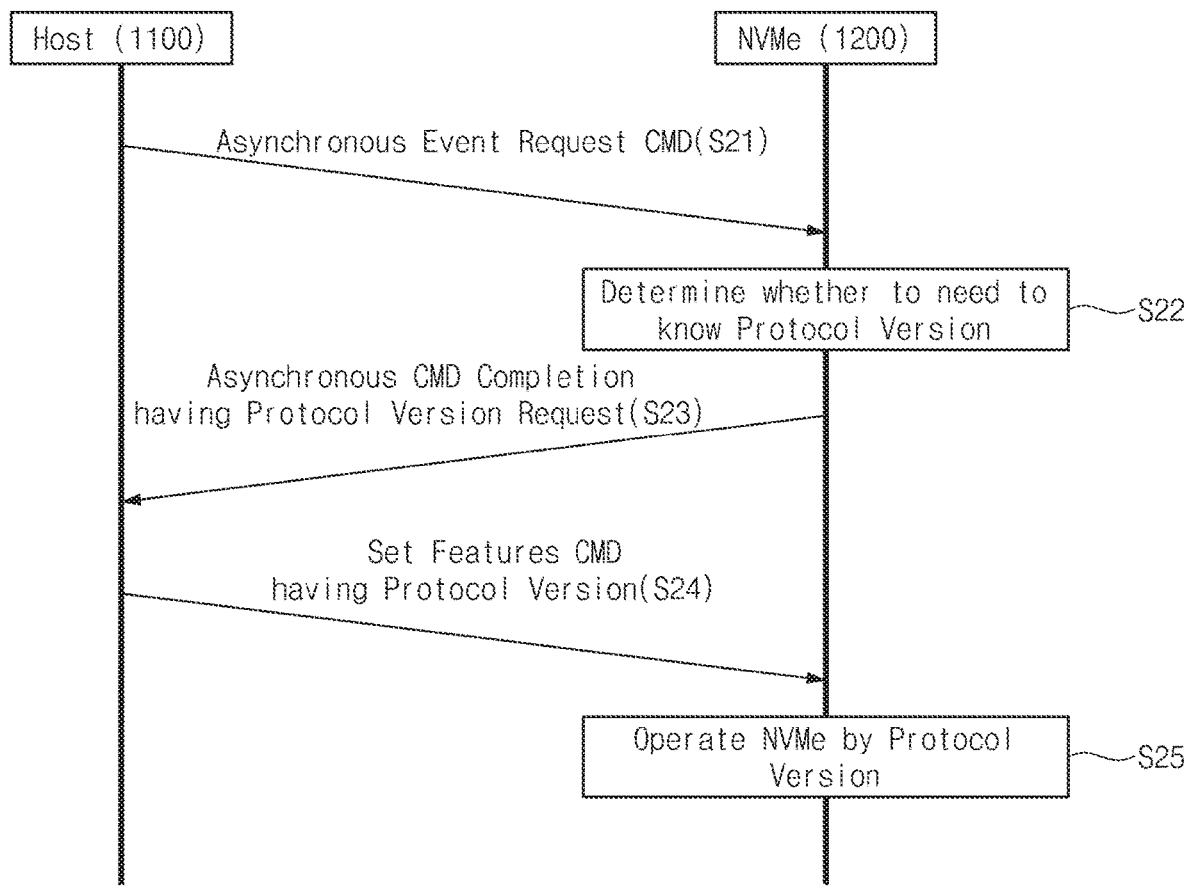
FIG. 5 is a diagram illustrating a protocol version request method according to an example embodiment of inventive concepts.
FIG. 6 is a diagram illustrating an asynchronous command completion according to another example embodiment of inventive concepts.

FIG. 5 is a diagram illustrating a protocol version request method according to an example embodiment of inventive concepts. Below, a protocol version request method of the storage device 1200 will be described with reference to FIGS. 1-2 and 5.

The storage device 1200 may fetch issued asynchronous event request commands from the submission queue 1110 of the host 1100 at S21. The plurality of asynchronous event request commands thus fetched may be stored in the asynchronous event request command buffer 1210. The storage device 1200 may determine whether a protocol version is to be known. Here, the protocol version may refer to information about firmware that is used to drive the storage device 1200.

If the protocol version is to be known, the storage device 1200 may insert a protocol version request into an asynchronous request completion about one of asynchronous event request commands. The storage device 1200 may transfer the asynchronous command completion having the protocol version request to the host 1100 at S23.

The host 1100 may transfer a set features command, which corresponds to the asynchronous command completion having the protocol version request, to the storage device 1200 at S24. Here, the set features command may include protocol version information that is used to manage the storage device 1200.

The storage device 1200 may operate in response to the protocol version information at S25.

According to an example embodiment, the storage device 1200 may transfer, to the host 1100, the protocol version request that is included in the asynchronous command completion of the asynchronous event request command.

FIG. 6 is a diagram illustrating an asynchronous command completion according to another example embodiment of inventive concepts. Referring to FIG. 6, the asynchronous command completion may include three bits [02:00] indicating a type of the asynchronous command completion, five bits [07:03] of a first reserved area, eight bits [15:08] indicating a request type, eight bits [23:16] that are not used and indicate a log page identifier, and eight bits [31:24] of a second reserved area. Here, the request type may include an NVMe version supported by the host 1100, for example, a protocol version request.

Figure 7:
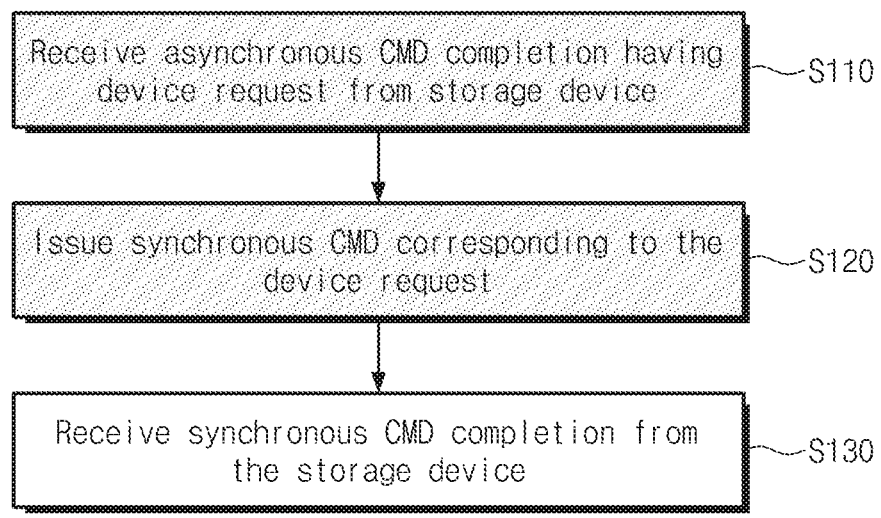
FIG. 7 is a diagram illustrating a command issuing method of a host, according to an example embodiment of inventive concepts.

FIG. 7 is a diagram illustrating a command issuing method of a host, according to an example embodiment of inventive concepts. A command issuing method of the host 1100 will be described with reference to FIGS. 1 to 7.

The host 1100 may receive the asynchronous command completion having a device request from the storage device 1200 at S110. The storage device 1200 may include the device request according to the internal policy in the asynchronous command completion and may transfer the device request the host 1100. The host 1100 may read the device request included in the asynchronous command completion and may issue a synchronous command corresponding to the device request at S10. The synchronous command thus issued may be fetched by the storage device 1200. The storage device 1200 may execute the fetched synchronous command to issue a synchronous command completion corresponding to the synchronous command. Afterwards, the host 1100 may receive a synchronous command completion from the storage device 1200 at S130.

The host 1100 according to an example embodiment may issue a synchronous command using the asynchronous command completion. Meanwhile, the order and method about a command issuing operation illustrated in FIG. 7 should be understood as not limited thereto.

Figure 8:
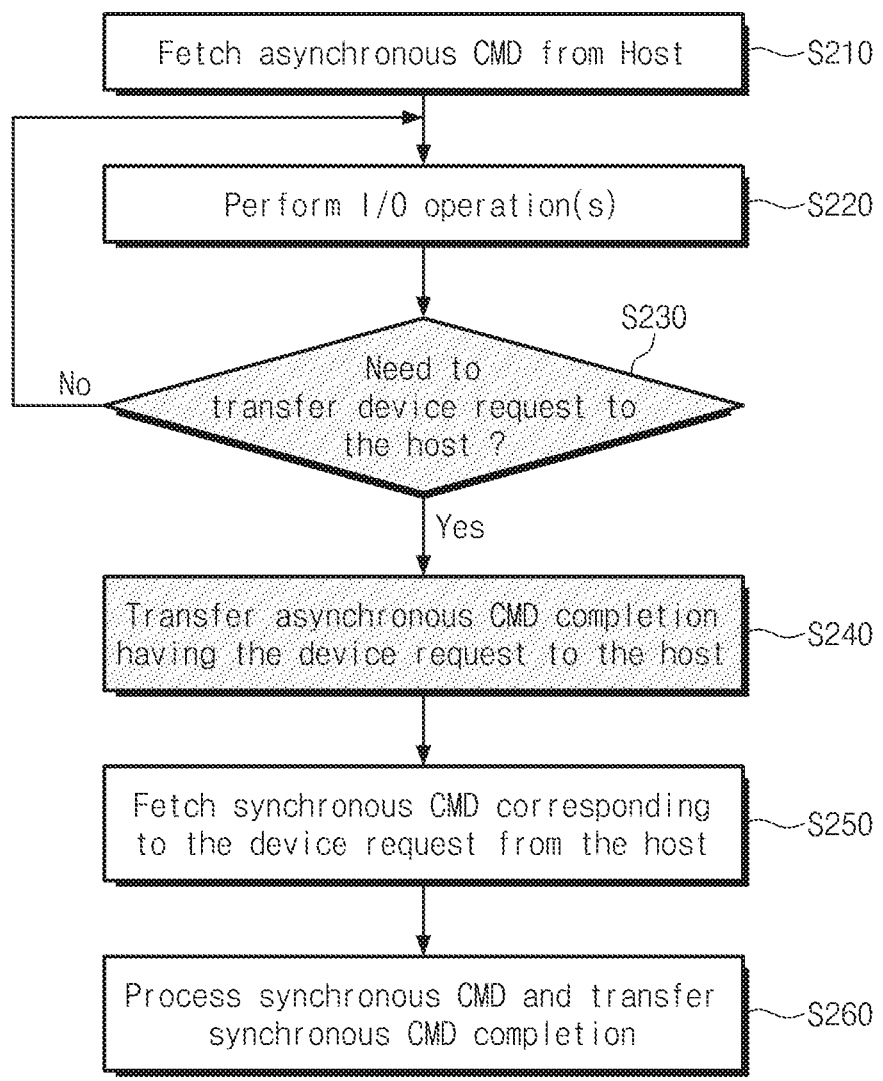
FIG. 8 is a diagram illustrating a command processing method of a storage device, according to an example embodiment of inventive concepts.

FIG. 8 is a diagram illustrating a command processing method of a storage device, according to an example embodiment of inventive concepts. A command processing method of the storage device 1200 will be described with reference to FIGS. 1 to 8.

The storage device 1200 may fetch at least one asynchronous event command from the host 1100 at S210. The storage device 1200 may perform at least one input/output (I/O) operation in response to an input/output request of the host 1100 at S220.

According to the internal policy, the device request module 1230 of the storage device 1200 may determine whether to transfer a device request to the host 1100 at S230.

If there is no need to transfer the device request to the host 1100, the process proceeds to step S220. In contrast, if the device request module 1230 determines there is a use to transfer the device request to the host 1100, the device request module 1230 may include the device request in the asynchronous command completion. The storage device 1200 may transfer the asynchronous command completion having the device request to the host 1100 at S240.

Afterwards, the storage device 1200 may fetch a synchronous command corresponding to the device request from the host 1100 at S250. Here, the synchronous command thus fetched may be issued by the device driver 1130 of the host 1100 to the submission queue 1110. Afterwards, the storage device 1200 may process the synchronous command and send a synchronous command completion to the host 1100 at S260.

According to an example embodiment, the storage device 1200 may transfer the device request to the host 1100 using the asynchronous command completion.

Figure 9:
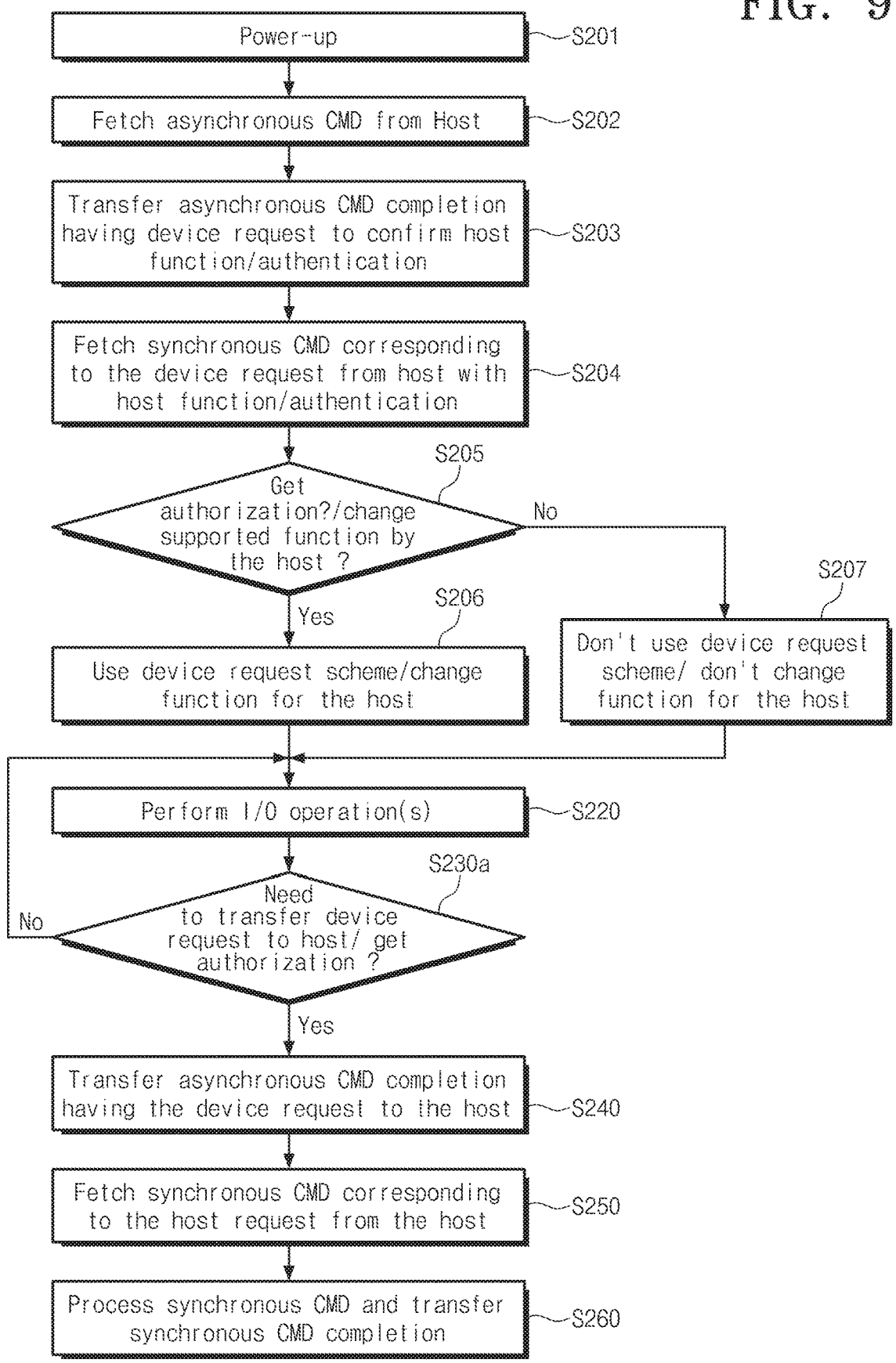
FIG. 9 is a diagram illustrating a command processing method of a storage device, according to another example embodiment of inventive concepts.

Meanwhile, the order and method about a command processing operation illustrated in FIG. 8 should be understood not being limited thereto. The command processing operation according to an example embodiment may be performed after a function of the host 1100 is provided or after authentication of the host 1100. FIG. 9 is a diagram illustrating a command processing method of a storage device, according to another example embodiment of inventive concepts. Compared to the command processing method of FIG. 8, a command processing method of the storage device 1200 illustrated in FIG. 9 may further include steps S201 to S207. The storage device 1200 may be powered up at S201. After power-up, the storage device 1200 may fetch an asynchronous command (e.g., an asynchronous event request command) from the host 1100 at S202. To confirm a host function (e.g., protocol version information)/authentication, the storage device 1200 may transfer asynchronous command completion having a device request to the host 1100 at S203. Afterwards, the host 1100 may parse the asynchronous command completion transferred from the storage device 1200 to issue a synchronous command corresponding to the device request having the host function/authentication. Afterwards, the storage device 1200 may fetch a synchronous command corresponding to the device request having the host function/authentication at S204. Afterwards, the storage device 1200 may determine whether to get the host authentication or whether a function (e.g., version information of a device driver) provided to the host 1100 is changed, based on the fetched synchronous command at S205.

If the host authentication is obtained or if the function provided to the host 1100 is changed, the storage device 1200 may use a device request scheme or may change a function for the host 1100 at S206. Here, the device request scheme may mean a method in which the storage device 1200 provides requirements to the host 1100 using the asynchronous command completion. In contrast, if the host authentication is not obtained or if the function provided to the host 110 is not changed, the storage device 1200 may not use the device request scheme or may not change the function for the host 1100 at S207.

Afterwards, the storage device 1200 may perform an I/O operation in response to a request from the host 1100 at S220. Afterwards, the storage device 1200 may determine whether to transfer the device request to the host 1100 or whether to get the host authentication at S230a. Afterwards, steps S240, S250, and S260 of FIG. 9 may be performed substantially the same as those of FIG. 8. Meanwhile, an order of the steps illustrated in FIG. 9 should be understood as not limiting example embodiments of inventive concepts.

Figure 10:
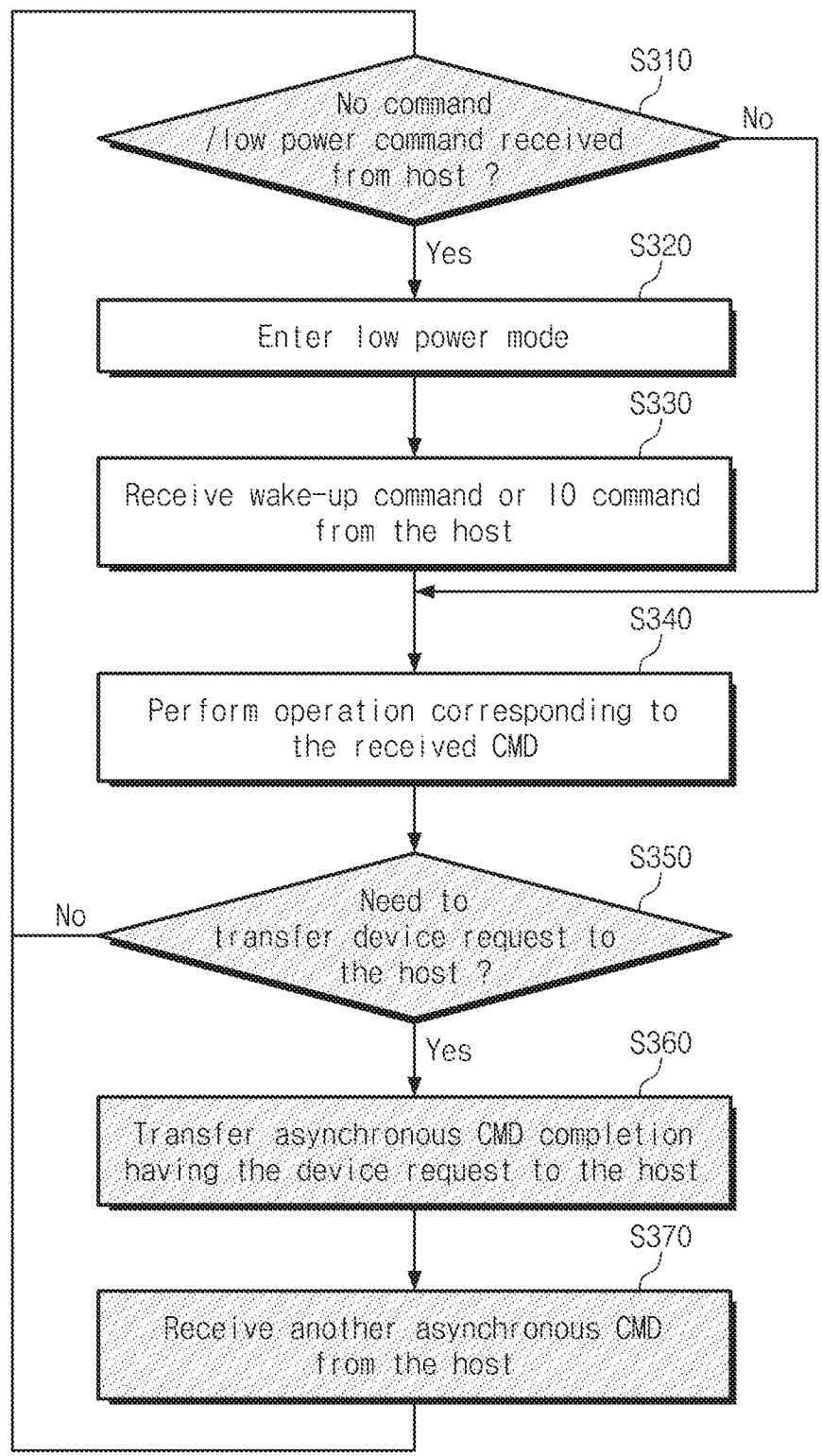
FIG. 10 is a diagram illustrating a command processing method of a storage device, according to another example embodiment of inventive concepts.

Meanwhile, the command processing method according to an example embodiment may be applied to a power consumption reducing operation. FIG. 10 is a diagram illustrating a command processing method of a storage device, according to another example embodiment of inventive concepts. A command processing method of the storage device 1200 will be described with reference to FIGS. 1 to 10.

Whether a command is not received from the host 1100 during a time period or whether a low-power command is received from the host 1100 may be determined by the storage device 1200 at S310.

If a command is not received from the host 1100 during a time period or the low-power command is received from the host 1100, the storage device 1200 may enter a low-power mode at S320. Here, the low-power mode may be an idle state. If not, the process proceeds to step S340.

The storage device 1200 may receive a wake-up command or an input/output command from the host 1100 at S330. The storage device 1200 may perform an operation corresponding to a received command at S340.

Afterwards, the storage device 1200 may determine whether to transfer a device request to the host 1100 at S350.

If the storage device 1200 determines to transfer the device request to the host 1100, the storage device 1200 may issue the asynchronous command completion having the device request and may transfer the asynchronous command completion to the host 1100 at S360. Afterwards, the storage device 1200 may receive another asynchronous command for the device request. Afterwards, the process returns to step S310.

Example embodiments of inventive concepts may be applied to a power-up operation.

Figure 11:
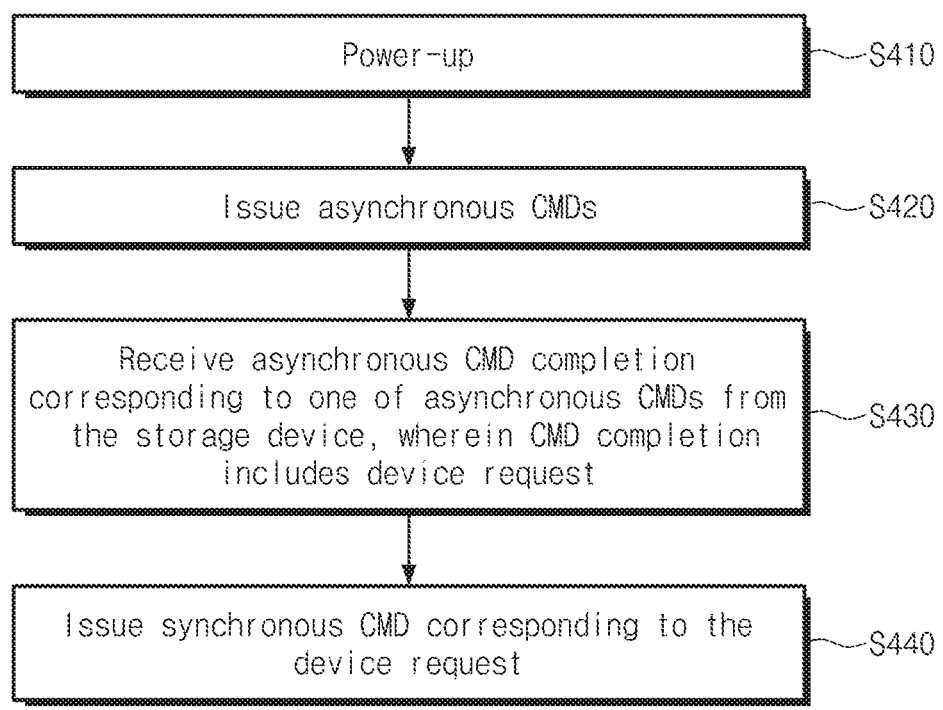
FIG. 11 is a diagram illustrating a method in which a host issues a command at power-up, according to an example embodiment of inventive concepts.

FIG. 11 is a diagram illustrating a method in which a host issues a command at power-up, according to an example embodiment of inventive concepts. A command issuing method of the host 1100 will be described with reference to FIGS. 1 to 11.

A power-up operation of the storage device 1200 may be performed at S410. That is, the storage device 1200 may be connected to the host 1100, or a power supply voltage may be supplied to the storage device 1200 from the host 1100. The host 1100 may issue asynchronous command, of which the number is determined in advance, for the storage device 1200 at S420. The asynchronous commands thus issued may be fetched and stored by the storage device 1200.

The host 1100 may receive an asynchronous command completion, which corresponds to one of asynchronous commands, from the storage device 1200 at a time at S430. The asynchronous command completion may include a device request about the host 1100.

The host 1100 may issue a synchronous command corresponding to the device request at S440. Here, the device request thus issued may be at least one set features command.

Figure 12:
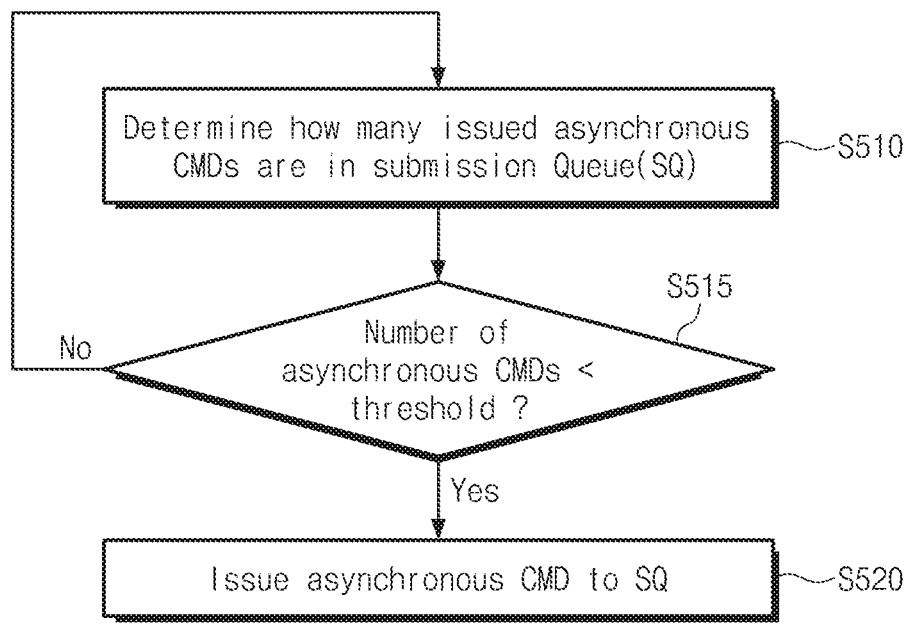
FIG. 12 is a diagram illustrating n asynchronous command managing method of a host, according to another example embodiment of inventive concepts.

Meanwhile, the number of asynchronous commands according to an example embodiment may be managed with a fixed value. FIG. 12 is a diagram illustrating an asynchronous command managing method of a host, according to another example embodiment of inventive concepts. An asynchronous command managing method of the host 1100 will be described with reference to FIGS. 1 to 12.

The host 1100 may determine how many asynchronous commands are in the submission queue (SQ) 1110. At S515, the host 1100 determines if the number of asynchronous commands is lower than the fixed value (a threshold). If the number of asynchronous commands is smaller than the value, the host 1100 may issue an asynchronous command to the submission queue 1110 (S520). If not, the host 1100 continues to monitor the number of asynchronous commands.

Figure 13:
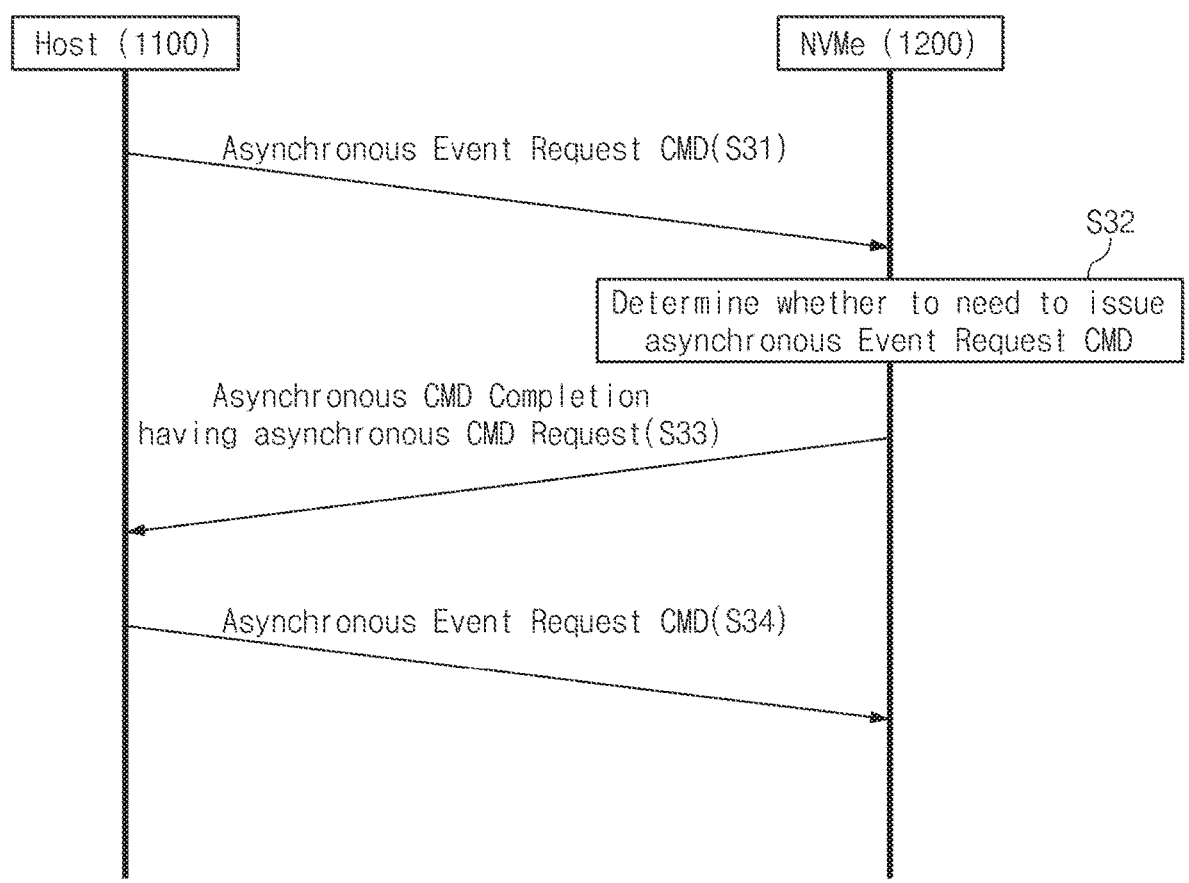
FIG. 13 is a diagram illustrating an asynchronous command requesting method of a storage device, according to an example embodiment of inventive concepts.

The host 1100 according to an example embodiment may maintain the number of asynchronous commands constantly. However, example embodiments of inventive concepts may not be limited thereto. According to an example embodiment, the storage device 1200 may request an asynchronous command. FIG. 13 is a diagram illustrating an asynchronous command requesting method of a storage device, according to an example embodiment of inventive concepts. An asynchronous command requesting method of the storage device 1200 will be described with reference to FIGS. 1 to 13.

The host 1100 may issue a plurality of asynchronous event request commands at S31. The storage device 1200 may fetch the plurality of asynchronous event request commands. The plurality of asynchronous event request commands thus fetched may be stored in the asynchronous event request command buffer 1210. The storage device 1200 may determine whether to issue an asynchronous event request command, based on the internal policy or a selection of the user at S32.

If the storage device 1200 determines to issue the asynchronous event request command, the storage device 1200 may insert a request, which is associated with issuing an asynchronous event request command, into an asynchronous request completion about one of the asynchronous event request commands. The storage device 1200 may transfer the asynchronous command completion, which has the request associated with the issuing of the asynchronous event request command, to the host 1100 at S33.

The host 1100 may issue an asynchronous event request command, which corresponds to the asynchronous command completion having the request associated with the issuing of the asynchronous event request command, to the submission queue 1110. Afterwards, the storage device 1200 may fetch and store the asynchronous event request command thus issued at S34.

Figure 14:
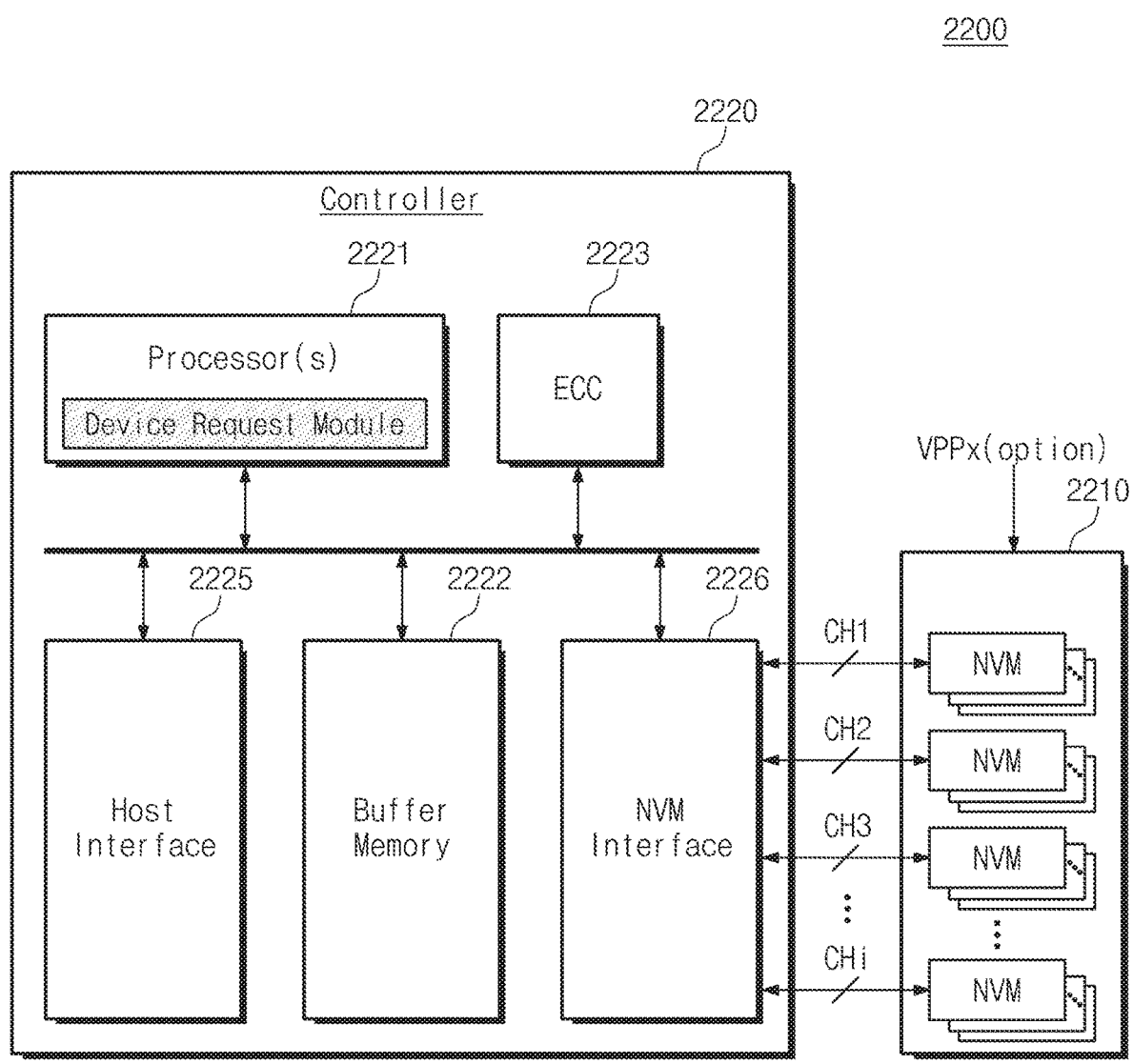
FIG. 14 is a block diagram illustrating a solid state drive according to an example embodiment of inventive concepts.

The storage device 1200 according to an example embodiment may be a solid state drive (SSD). FIG. 14 is a block diagram illustrating a solid state drive (SSD) according to an example embodiment of inventive concepts. Referring to FIG. 14, an SSD 2200 may include a plurality of nonvolatile memory devices 2210 and a controller 2220. The storage device 1200 may be the SSD2200.

The nonvolatile devices 2210 may be implemented to receive an external high voltage Vppx optionally. Each of the nonvolatile memory devices 2210 may be a NAND flash memory, a vertical NAND flash memory (VNAND), a NOR flash memory, a resistive random access memory (RAM), a phase-change memory (PRAM), a magneto-resistive random access memory (MRAM), a ferroelectric random access memory (FRAM), a spin transfer toque random access memory (STT-RAM), the like.

Furthermore, the nonvolatile memory may be implemented to have a three-dimensional array structure. In an embodiment of the inventive concept, a three dimensional (3D) memory array is provided. The 3D memory array is monolithically formed in one or more physical levels of arrays of memory cells having an active area disposed above a silicon substrate and circuitry associated with the operation of those memory cells, whether such associated circuitry is above or within such substrate. The circuit related on an operation of memory cells may be located in a substrate or on a substrate. The term "monolithic" means that layers of each level of the array are directly deposited on the layers of each underlying level of the array.

In an example embodiment of inventive concepts, the 3D memory array includes vertical NAND strings that are vertically oriented such that at least one memory cell is located over another memory cell. The at least one memory cell may comprise a charge trap layer. Each vertical NAND string may include at least one select transistor located over memory cells. The at least one select transistor having the same structure with the memory cells and being formed monolithically together with the memory cells.

The following patent documents, which are hereby incorporated by reference, describe suitable configurations for three-dimensional memory arrays, in which the three-dimensional memory array is configured as a plurality of levels, which is applied by Samsung Electronics Co., with word lines and/or bit lines shared between levels: U.S. Pat. Nos. 7,679,133; 8,553,466; 8,654,587; 8,559,235; and US Pat. Pub. No. 2011/0233648. The nonvolatile memory according to an example embodiment of inventive concepts may be applicable to a charge trap flash (CTF) in which an insulating layer is used as a charge storage layer, as well as a flash memory device in which a conductive floating gate is used as a charge storage layer. Below, for descriptive convenience, a nonvolatile memory device may be referred to as "vertical NAND flash memory".

The controller 2220 may be connected to the nonvolatile devices 2210 through a plurality of channels CH1 to CHi (i.e., i being an integer of 2 or more). The controller 2220 may be implemented with a memory controller described with reference to FIGS. 1 to 13.

The controller 2220 may include at least one processor 2221, a buffer memory 2222, an error correction code (ECC) circuit 2223, a host interface 2225, and a nonvolatile memory interface 2226.

The buffer memory 2222 may temporarily store data used to operate the memory controller 2220. The buffer memory 2222 may include a plurality of memory lines that is used to store data or a command. Here, the plurality of memory lines may be mapped to cache lines in various methods. The buffer memory 2222 may store page bitmap information and read count information. The page bitmap information or the read count information may be read from the nonvolatile memory device 2210 at power-up and may be updated according to an internal operation. The updated page bitmap information or read count information may be stored in the nonvolatile memory device 2210 periodically or randomly.

The error correction code circuit 2223 may calculate a value of an error correction code of data to be programmed in a writing operation, may correct data read in a reading operation based on the value of the error correction code, and may correct an error recovered from the nonvolatile memories 2210. Even though not illustrated, the controller 2220 may further include a code memory that stores code data for an operation of the controller 2220. The code memory may be implemented with a nonvolatile memory device.

The host interface 2225 may provide an interface function for interfacing with an external device. Here, the host interface 2225 may be a NAND flash interface. In addition, the host interface 2225 may be implemented in various interface manners and may be implemented with a plurality of interfaces. The nonvolatile memory interface 2226 may provide an interface function with nonvolatile memory device 2210.

Furthermore, the controller 2220 according to an example embodiment may include the device request module 1230 illustrated in FIG. 1 or may be implemented to transfer a device request to a host using an asynchronous command completion as described with reference to FIGS. 1 to 13.

According to a policy, the SSD 2200 according to an example embodiment may transfer a device request to the host, thereby improving the data integrity markedly. As such, the SSD 2200 may be applicable to a server of a data center.

Figure 15:
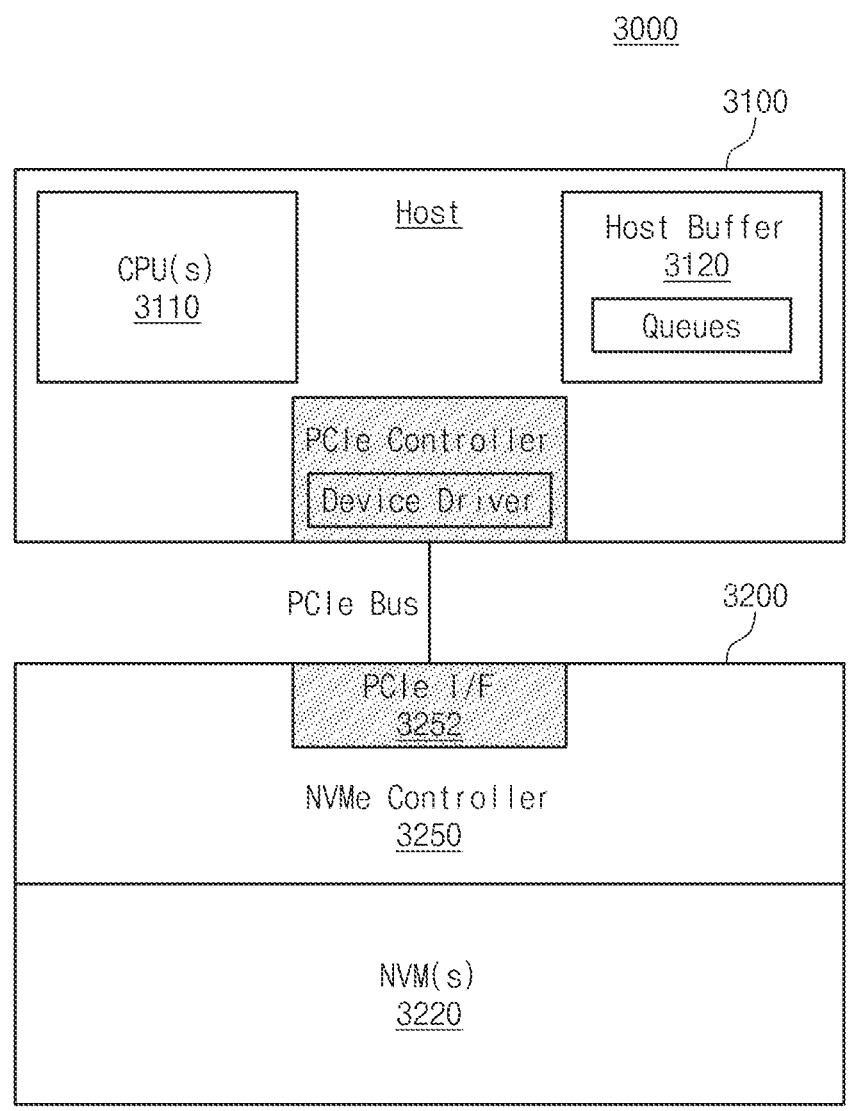
FIG. 15 is a block diagram illustrating a computing system according to an example embodiment of inventive concepts.

Meanwhile, the host and the storage device may be interconnected by a peripheral component interconnect express (PCIe) interface. FIG. 15 is a block diagram illustrating a computing system 3000 according to an example embodiment of inventive concepts. Referring to FIG. 15, a computing system 3000 may include a host 3100 and at least one storage device 3200. The host 3100 and the storage device 3200 may be interconnected through a PCIe bus.

The host 3100 may include at least one central processing unit (CPU) 3110, a host buffer memory 3120, and a PCIe controller 3130. The host buffer memory 3120 may store a submission queue and a completion queue. In an example embodiment, the PCIe controller 3130 may include the device driver 1130 illustrated in FIG. 1.

The storage device 3200 may include at least one nonvolatile memory device 3220 and a memory controller 3250 controlling the nonvolatile memory device 3220. The memory controller 3250 may include a PCIe interface (I/F) 3252 connected with the PCIe controller 3130. The memory controller 3250 may be implemented to include the device request module 1230 illustrated in FIG. 1.

Therefore, it should be understood that the above example embodiments are not limiting, but illustrative.

According to an example embodiment of inventive concepts, a host system may transfer a device request of a storage device to a host using an asynchronous command completion of an asynchronous event request command.

While inventive concepts have been described with reference to example embodiments, it be apparent to those skilled in the art that various changes and modifications may be made without departing from the spirit and scope of inventive concepts. Therefore, it should be understood that the above example embodiments are not limiting, but illustrative.

What is claimed is:

1. A method for transferring a request in a storage device, the method comprising:
   generating an asynchronous command completion corresponding to at least one asynchronous event request command, the asynchronous command completion including a wall clock time request;
   receiving a set features command corresponding to the asynchronous command completion, the set features command having a timestamp; and
   updating a wall clock time using the timestamp.

2. The method of claim 1, further comprising:
   receiving the at least one asynchronous event request command.

3. The method of claim 1, further comprising:
   determining whether to use the wall clock time.

4. The method of claim 3, wherein the determining is based on an internal policy of the storage device.

5. The method of claim 3, wherein the determining is based on a wake-up command received from a host.

6. The method of claim 3, wherein the determining determines whether to use the wall clock time at a power-up of the storage device.

7. The method of claim 1, wherein the generating:
generates the asynchronous command completion after (i) determination of whether a host includes a function of parsing the asynchronous command completion having the wall clock time request or (ii) an authentication of the host.

8. The method of claim 1, wherein the asynchronous command completion includes three bits indicating a type, five bits of a first reserved area, seven bits indicating a timestamp request corresponding to the wall clock time request, eight bits indicating a log page identifier, and eight bits of a second reserved area.

9. The method of claim 1, further comprising:
determining whether to request the at least one asynchronous event request command.

10. The method of claim 9, further comprising:
requesting a host to issue the at least one asynchronous event request command when a number of other asynchronous event request commands stored in the storage device is smaller than a reference value, the requesting including,
sending a request associated with an issue of the at least one asynchronous event request command to the host through another asynchronous command completion.

11. The method of claim 10, further comprising:
fetching the at least one asynchronous event request command from the host in response to the another asynchronous command completion.

12. A method for transferring a request in a storage device, the method comprising:
receiving an asynchronous event request command;
determining whether to obtain a protocol version about the storage device;
generating an asynchronous command completion, based on the determining, the asynchronous command completion corresponding to the asynchronous event request command, the asynchronous command completion including a protocol version request;
receiving a set features command having protocol version information, the set features command corresponding to the asynchronous command completion; and
operating the storage device using the protocol version information.

13. The method of claim 12, wherein the determining determines whether to obtain the protocol version at a power-up of the storage device.

14. The method of claim 12, wherein the asynchronous command completion includes three bits indicating a type, five bits of a first reserved area, seven bits indicating the protocol version request, eight bits indicating a log page identifier, and eight bits of a second reserved area.

15. A method for issuing a command by a host, the method comprising:
receiving an asynchronous command completion, the asynchronous command completion having a device request from a storage device;
parsing the device request in response to the asynchronous command completion and issuing a synchronous command corresponding to the device request; and
receiving a synchronous command completion corresponding to the synchronous command.

16. The method of claim 15, wherein an asynchronous command is an asynchronous event request command.

17. The method of claim 16, further comprising:
maintaining a number of asynchronous event request commands issued at a reference value.

18. The method of claim 15, wherein the synchronous command is a set features command.

19. The method of claim 15, wherein the storage device is a solid state drive (SSD), and
the SSD includes at least one NAND flash memory device.

20. The method of claim 15, wherein the host and the storage device are interconnected through a peripheral component interconnect express (PCIe) interface.

* * * * *